United States Patent
Kim et al.

(10) Patent No.: US 9,402,252 B2
(45) Date of Patent: Jul. 26, 2016

(54) METHOD OF MONITORING A CONTROL CHANNEL, AND WIRELESS DEVICE USING SAME

(71) Applicant: LG ELECTRONICS INC., Seoul (KR)

(72) Inventors: Hak Seong Kim, Anyang-si (KR); Han Byul Seo, Anyang-si (KR)

(73) Assignee: LG Electronics Inc., Seoul (KR)

( * ) Notice: Subject to any disclaimer, the term of this patent is extended or adjusted under 35 U.S.C. 154(b) by 26 days.

(21) Appl. No.: 14/350,536

(22) PCT Filed: Oct. 19, 2012

(86) PCT No.: PCT/KR2012/008615
§ 371 (c)(1),
(2) Date: Apr. 8, 2014

(87) PCT Pub. No.: WO2013/058606
PCT Pub. Date: Apr. 25, 2013

(65) Prior Publication Data
US 2014/0254533 A1     Sep. 11, 2014

Related U.S. Application Data

(60) Provisional application No. 61/549,198, filed on Oct. 19, 2011.

(51) Int. Cl.
*H04W 72/04* (2009.01)
*H04B 7/04* (2006.01)
*H04L 5/00* (2006.01)

(52) U.S. Cl.
CPC ........... *H04W 72/042* (2013.01); *H04B 7/0413* (2013.01); *H04L 5/0023* (2013.01); *H04L 5/0053* (2013.01); *H04B 7/0417* (2013.01); *H04L 5/001* (2013.01); *H04L 5/0048* (2013.01)

(58) Field of Classification Search
None
See application file for complete search history.

(56) References Cited

U.S. PATENT DOCUMENTS

| 2010/0135159 | A1  | 6/2010  | Chun et al. |
| 2010/0254329 | A1* | 10/2010 | Pan ......................... H04L 5/001 370/329 |
| 2010/0279628 | A1* | 11/2010 | Love et al. ...................... 455/70 |
| 2010/0302983 | A1* | 12/2010 | McBeath .............. H04L 5/0005 370/311 |
| 2011/0085513 | A1* | 4/2011  | Chen et al. .................... 370/330 |

(Continued)

FOREIGN PATENT DOCUMENTS

CN    101584191 A    11/2009

OTHER PUBLICATIONS

Performance evaluation of multiplexing schemes for enhanced PDCCH transmission, R1-113195, 3GPP TSG RAN WG1 Meeting #66bis, Zhuhai, China, Oct. 10-14, 2011, see section 2.1 and figure 1.*

(Continued)

*Primary Examiner* — Ayaz Sheikh
*Assistant Examiner* — Mariela Vidal Carpio
(74) *Attorney, Agent, or Firm* — Birch, Stewart, Kolasch & Birch, LLP

(57) ABSTRACT

The present invention relates to a method of monitoring a control channel and a wireless device using same in a multiple antenna system in which a plurality of layers are defined. The wireless device monitors a first downlink control channel in a first search space which is mapped to a first layer, and a second downlink control channel in a second search space which is mapped to a second layer. The first layer of the plurality of layers is the lowest layer.

14 Claims, 15 Drawing Sheets

(56) References Cited

U.S. PATENT DOCUMENTS

| | | | | |
|---|---|---|---|---|
| 2011/0274031 | A1* | 11/2011 | Gaal et al. ..................... 370/315 |
| 2011/0299484 | A1* | 12/2011 | Nam ..................... H04L 1/0025 370/329 |
| 2012/0093112 | A1* | 4/2012 | Qu ......................... H04L 5/001 370/329 |
| 2012/0320841 | A1* | 12/2012 | Miki ..................... H04B 7/0689 370/329 |
| 2013/0064216 | A1* | 3/2013 | Gao ..................... H04L 5/0016 370/330 |
| 2013/0094449 | A1* | 4/2013 | Takeda ................. H04L 1/1854 370/329 |
| 2013/0208645 | A1* | 8/2013 | Feng ....................... H04L 5/003 370/312 |
| 2014/0044070 | A1* | 2/2014 | Chen et al. ..................... 370/329 |
| 2014/0169343 | A1* | 6/2014 | Skov ..................... H04L 5/0007 370/336 |

OTHER PUBLICATIONS

ETRI, Discussions on enhanced PDCCH structure, R1-112211, 3GPP TSG RAN WG1 Meeting #66, Athens, Greece, Aug. 22-26, 2011, see section 2 and section 3, pp. 1-3.

Intel Corporation, Performance Analysis of the Enhanced Downlink Control Signalling, R1-113202, 3GPP TSG RAN WG1 Meeting #66bis, Zhuhai, China, Oct. 10-14, 2011, see section 2.1 and section 3, 5 pages.

LG Electronics, Performance evaluation of multiplexing schemes for enhanced PDCCH transmission, R1-113195, 3GPP TSG RAN WG1 Meeting #66bis, Zhuhai, China, Oct. 10-14, 2011, see section 2.1 and figure 1, 6 pages.

* cited by examiner

METHOD OF MONITORING A CONTROL CHANNEL, AND WIRELESS DEVICE USING SAME

CROSS REFERENCE TO RELATED APPLICATIONS

This application is the National Phase of PCT/KR2012/008615 filed on Oct. 19, 2012, which claims priority under 35 U.S.C. §119(e) to U.S. Provisional Application No. 61/549,198 filed on Oct. 19, 2011, all of which are hereby expressly incorporated by reference into the present application.

BACKGROUND OF THE INVENTION

1. Field of the Invention

The present invention concerns wireless communications, and more specifically, to a method of monitoring a control channel in a wireless communication system and a wireless device using the same.

2. Related Art

3GPP ($3^{rd}$ Generation Partnership Project) TS (Technical Specification) Release 8-based LTE (Long Term Evolution) is the potent next-generation mobile communication standard. Recently, LTA-A (LTE-Advanced) based on 3GPP TS release 10 supporting multiple carriers are underway for its standardization.

Mobile communication systems are also adopting MIMO (Multiple Input Multiple Output) technique using multiple antennas. 3GPP LTE supports up to four transmission antennas and 3GPP LTE-A supports up to eight transmission antennas.

The MIMO technology comprises a spatial diversity scheme in which data symbols are transmitted via various pathways to thereby increase transmission reliability and a spatial multiplexing scheme in which multiple data symbols are simultaneously transmitted through multiple transmission antennas. Further, MIMO schemes may be separated into SU-MIMO (Single User-MIMO) and MU-MIMO (Multi User-MIMO).

The capacity of a MIMO channel increases in proportion to the number of antennas. A MIMO channel may be split into independent channels. Assuming that the number of transmission antennas is Nt and the number of reception antennas is Nr, the number of independent channels, Ni, meets Ni≤min{Nt, Nr}. Each independent channel may correspond to a layer. The layer may be defined as an information path that is input to a precoder. The rank is the number of non-zero eigen values in a MIMO channel matrix and is equal to the number of layers or the number of space streams.

In 3GPP/LTE-A, the control channel does not support multi-antenna transmission. The control channel has been designed to assume transmission through a single antenna.

However, to respond to increasing control information and to increase scheduling flexibility, control channels need to be transmitted via multiple antennas, and a need exists for monitoring the same.

SUMMARY OF THE INVENTION

The present invention provides a method of monitoring a control channel in a multi-antenna system defining a plurality of layers and a wireless device using the same.

In an aspect, a method of monitoring a control channel in a multi-antenna system in which a plurality of layers are defined is provided. The method includes monitoring, by a wireless device, a first downlink control channel in a first search space mapped with a first layer, and monitoring, by the wireless device, a second downlink control channel in a second search space mapped with a second layer. The first layer is a lowest layer among the plurality of layers.

The method may further include receiving a first demodulation reference signal (DM RS) associated with the first downlink control channel in the first search space, and receiving a second DM RS associated with the second downlink control channel in the second search space.

The first DM RS may be applied with a same precoding as the first search space, and the second DM RS may be applied with a same precoding as the second search space.

In another aspect, a wireless device configured to monitor a control channel in a multi-antenna system in which a plurality of layers are defined is provided. The wireless device includes a radio frequency (RF) unit configured to transmit and receive a radio signal; and a processor operatively connected with the RF unit and configured to monitor a first downlink control channel in a first search space mapped with a first layer, and monitor a second downlink control channel in a second search space mapped with a second layer.

It is possible to transmit and monitor a control channel by utilizing spatial multiplexing in a multi-antenna system.

DESCRIPTION OF EXEMPLARY EMBODIMENTS

A wireless device may be stationary or mobile and a UE (User Equipment) may be referred to as an MS (mobile station), an MT (mobile terminal), a UT (user terminal), an SS (subscriber station), a wireless device, a PDA (personal digital assistant), a wireless modem, or a handheld device. Or, a wireless device may be a device that supports only data communication such as an MTC (machine-type communication) device.

A BS (base station) generally denotes a fixed station that communicates with a wireless device and may be referred to as an eNB (evolved-NodeB), a BTS (Base Transceiver System), or an access point.

Hereinafter, the present invention is described to apply based on 3GPP (3d Generation Partnership Project) TS (Technical Specification) release 8-based 3GPP LTE (long term evolution) or 3GPP TS release 10-based 3GPP LTE-A. This is merely an example, and the present invention may apply to various wireless communication networks. Hereinafter, the "LTE" comprises LTE and/or LTE-A.

A wireless device may be served by a plurality of serving cells. Each serving cell may be defined with a DL (downlink) CC (component carrier) or with a pair of a DL CC and a UL (uplink) CC.

Serving cells may be classified into primary cells and secondary cells. A primary cell operates at a first frequency and is a cell that performs an initial connection establishment process or a connection reestablishment process or that is designated as a first cell during a handover process. The first cell is also denoted as a reference cell. A secondary cell operates at a second frequency, may be configured after an RRC (radio resource control) connection is established, and may be used to provide an additional radio resource. At least one primary cell is always configured, and secondary cell(s) may be added/modified/released by upper layer signaling (e.g., RRC (radio resource control) message).

The CI (cell index) of a primary cell may be fixed. For example, a lowest CI may be designated as the CI of a primary cell. Hereinafter, the CI of a primary cell is 0, and CIs of secondary cells are sequentially assigned 1 and its subsequent numbers.

Figure 1:
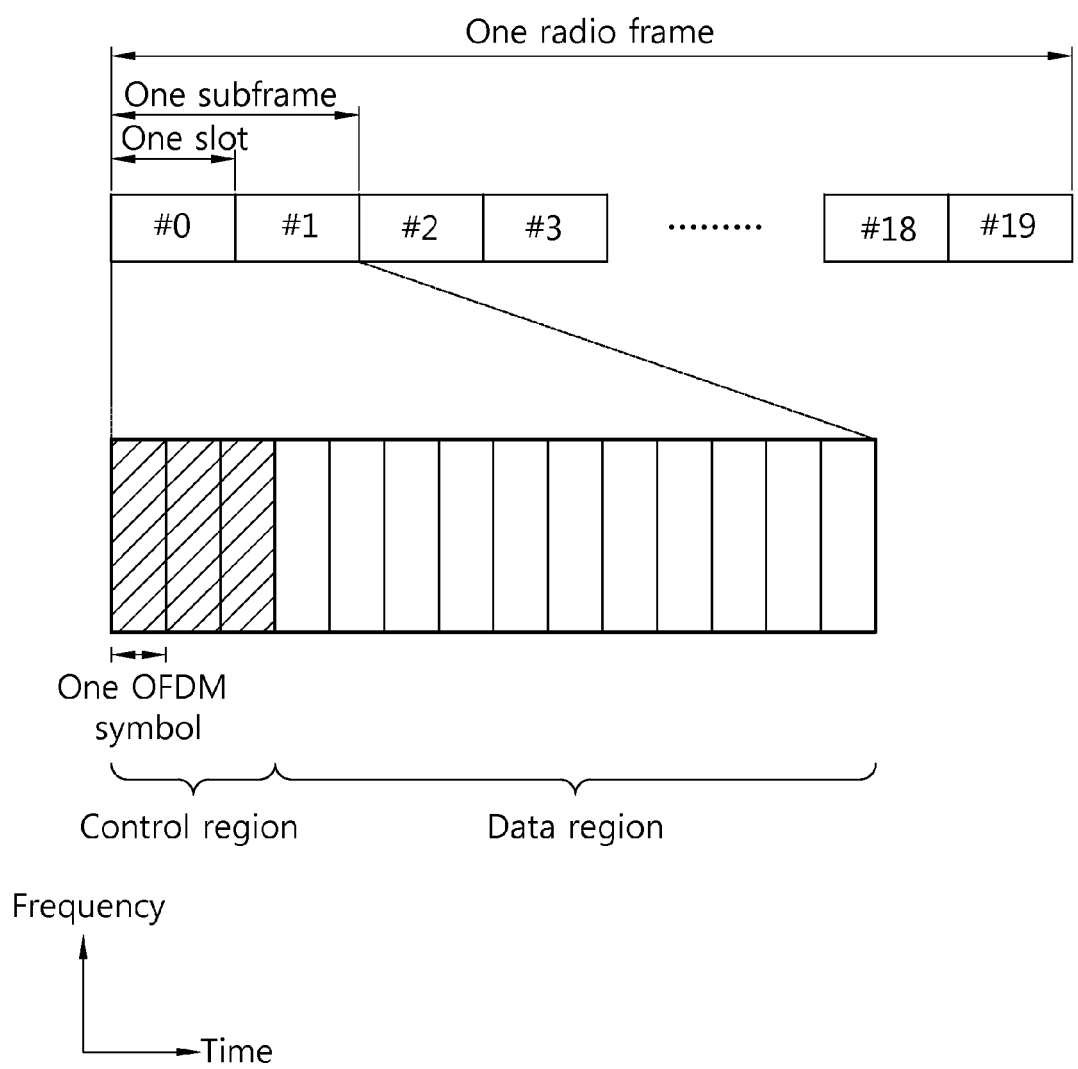
FIG. 1 shows the structure of a downlink radio frame in 3GPP LTE-A.

FIG. 1 shows the structure of a 3GPP LTE-A downlink radio frame. See 3GPP TS 36.211 V10.2.0 (2011-06) "Evolved Universal Terrestrial Radio Access (E-UTRA); Physical Channels and Modulation (Release 10)," Ch. 6.

A radio frame includes 10 subframes indexed 0 to 9. One subframe includes two consecutive slots. The time taken for one subframe to be transmitted is denoted a TTI (transmission time interval). For example, the length of one subframe is 1 ms, and the length of one slot is 0.5 ms.

One slot may include a plurality of OFDM (orthogonal frequency division multiplexing) symbols in the time domain. The term "OFDM symbol" is used solely to represent one symbol period in the time domain because 3GPP LTE adopts OFDMA (orthogonal frequency division multiple access) on downlink (DL), and multiple access schemes or names are not limited thereto. For example, the OFDM symbol may also be denoted as an SC-FDMA (single carrier-frequency division multiple access) symbol or symbol period.

One slot includes, e.g., seven OFDM symbols. However, the number of OFDM symbols included in one slot may vary depending on the length of a CP (cyclic prefix). According to 3GPP TS 36.211 V 10.2.0, one slot includes seven OFDM symbols in normal CP and six OFDM symbols in extended CP.

A resource block (RB) is a unit of resource allocation. One slot includes a plurality of sub-carriers. For example, if one slot includes seven OFDM symbols in the time domain and a resource block includes 12 sub-carriers in the frequency domain, the resource block may include 7×12 REs (resource elements).

A DL (downlink) subframe is separated into a control region and a data region in the time domain. The control region includes up to first four OFDM symbols in the first slot of the subframe, but the number of OFDM symbols included in the control region may change. The control region is assigned a PDCCH (physical downlink control channel) and other control channels and the data region is assigned a PDSCH.

As set forth in 3GPP TS 36.211 V10.2.0, 3GPP LTE/LTE-A physical control channels include a PDCCH (physical downlink control channel), a PCFICH (physical control format indicator channel), and a PHICH (physical hybrid-ARQ indicator channel).

The PCFICH transmitted on the first OFDM symbol in the subframe carries a CFI (control format indicator) regarding the number of OFDM symbols used for transmission of control channels in the subframe (i.e., size of control region). The wireless device receives the CFI over the PCFICH and then monitors the PDCCH.

Unlike the PDCCH, the PCFICH is transmitted through a fixed PCFICH resource in the subframe without being blind-decoded.

The PHICH carries an ACK (positive-acknowledgement)/NACK (negative-acknowledgement) signal for uplink HARQ (hybrid automatic repeat request). The ACK/NACK signal for the UL (uplink) data over the PUSCH transmitted by the wireless device is transferred on the PHICH.

The PBCH (Physical Broadcast Channel) is transmitted on the first four OFDM symbols in the second slot of the first subframe of the radio frame. The PBCH delivers system information necessary for the wireless device to communicate with the base station. The system information carried on the PBCH is referred to as MIB master information block). By comparison, the system information transmitted on the PDSCH indicated by the PDCCH is denoted SIB (system information block).

The control information transmitted through the PDCCH is denoted downlink control information (DCI). DCI may contain PDSCH resource allocation (which is denoted DL grant), PUSCH resource allocation (which is denoted UL grant), a set of transmission power control commands for the individual UEs in a UE group, and/or VoIP (voice over internet protocol) activation.

In 3GPP LTE/LTE-A, a DL transport block is transmitted on a pair of PDCCH and PDSCH. A UL transport block is transmitted on a pair of PDCCH and PUSCH. For example, the wireless device receives a DL transport block over a PDSCH indicated by a PDCCH. The wireless device monitors the PDCCH in the DL subframe and receives DL resource allocation over the PDCCH. The wireless device receives a DL transport block on a PDSCH indicated by the DL resource allocation.

Figure 2:
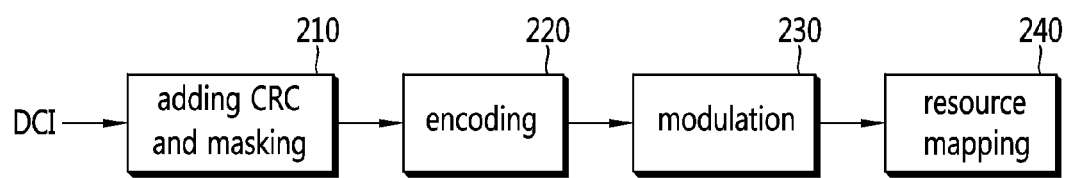
FIG. 2 is a block diagram illustrating the configuration of a PDCCH.

FIG. 2 is a block diagram illustrating the configuration of a PDCCH.

In 3GPP LTE/LTE-A, blind decoding is used to detect a PDCCH. Blind decoding is a scheme in which a desired identifier is demasked to a received PDCCH (this is called candidate PDCCH) and a CRC error is checked to thereby verify whether the PDCCH is its own control channel.

The base station determines a PDCCH format depending on a DCI that is to be sent to the wireless device, adds a CRC (cyclic redundancy check) to the DCI, and masks to the CRC a unique identifier (this is called RNTI (radio network temporary identifier) depending on the owner or purpose of the PDCCH (block 210).

In case the PDCCH is for a specific wireless device, the wireless device's unique identifier, e.g., C-RNTI (cell-RNTI), may be masked to the CRC. Or, in case the PDCCH is for a paging message, a paging indication identifier, e.g., P-RNTI (Paging-RNTI), may be masked to the CRC. In case the PDCCH is for system information, a system information identifier, SI-RNTI (system information-RNTI), may be masked to the CRC. In order to indicate a random access response, which is responsive to transmission of a random access preamble, an RA-RNTI (random access-RNTI) may be masked to the CRC. In order to indicate a TPC (transmit power control) command for a plurality of wireless devices, a TPC-RNTI may be masked to the CRC.

If the C-RNTI is used, the PDCCH carries control information for a corresponding specific wireless device (this is called UE-specific control information), and if other RNTI is used, the PDCCH carries common control information that is received by all or plural wireless devices in the cell.

The CRC-added DCI is encoded, generating encoded data (block 220). Encoding includes channel encoding and rate matching.

The encoded data is modulated, thus generating modulation symbols (block 230).

The modulation symbols are mapped to physical resource elements (REs) (block 240). Each modulation symbol is mapped with an RE.

The control region in the subframe includes a plurality of control channel elements (CCEs). The CCE is a unit of logical allocation, which is used to provide a coding rate according to a state of a radio channel to the PDCCH, and corresponds to a plurality of REGs (resource element groups). An REG includes a plurality of resource elements. In accordance with the correlation between the number of CCEs and a coding rate provided by CCEs, the format and possible bit count of the PDCCH are determined.

One REG includes four REs and one CCE includes nine REGs. To configure one PDCCH, {1, 2, 4, 8} CCEs may be put to use, and each element in {1, 2, 4, 8} is denoted CCE aggregation level.

The number of CCEs used for transmission of the PDCCH is determined by the base station depending on a channel state. For example, one CCE may be used for transmission of the PDCCH in a wireless device having a good downlink channel state. In a wireless device having a poor downlink channel state, eight CCEs may be used for transmission of the PDCCH.

A control channel comprising one or more CCEs is subjected to per-REG interleaving, and after going through a cell ID (identifier)-based cyclic shift, is mapped with a physical resource.

Figure 3:
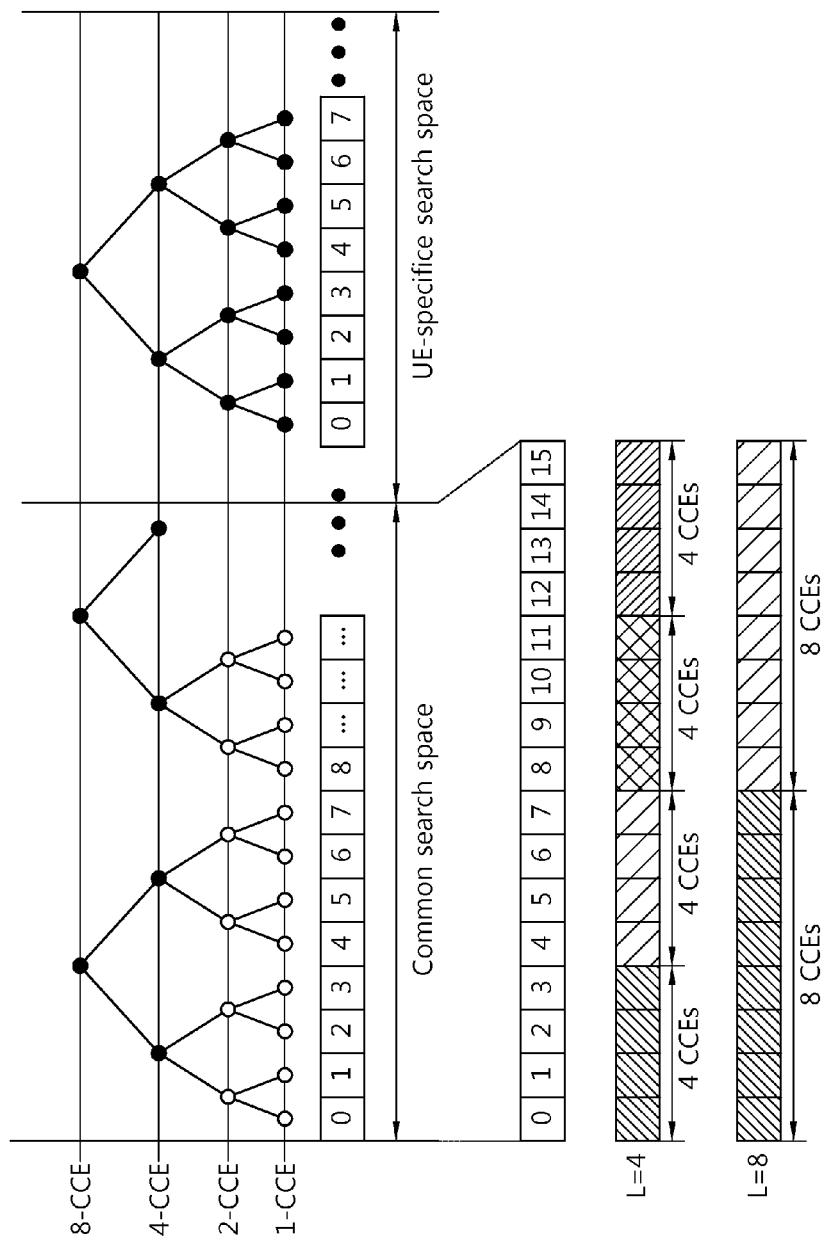
FIG. 3 is a view illustrating an example of monitoring a PDCCH.

FIG. 3 shows an example of PDCCH monitoring. Refer to section 9 of 3GPP TS 36.213 V10.2.0 (2011-06).

In 3GPP LTE, blind decoding is adopted to detect a PDCCH. Blind decoding is a scheme in which a desired identifier is demasked to a CRC of a received PDCCH (this is called PDCCH candidate) and a CRC error is checked to thereby identify whether the corresponding PDCCH is its own control channel. The wireless device is not aware of what CCE aggregation level or DCI format its PDCCH uses at what position in the control region.

A plurality of PDCCHs may be sent in one subframe. The wireless device monitors a plurality of PDCCHs for every subframe. Here, the monitoring refers to the wireless device attempting to decode the PDCCH depending on the format of the PDCCH to be monitored.

In 3GPP LTE, a search space is used to lessen burden due to blind decoding. The search space may be a CCE's monitoring set for the PDCCH. The wireless device monitors the PDCCH in the corresponding search space.

Search spaces are divided into a common search space and a UE-specific search space. The common search space is a space for searching a PDCCH having common control information and consists of 16 CCEs indexed 0 to 15 while supporting a PDCCH having a CCE aggregation level of {4, 8}. However, a PDCCH (DCI format 0, 1A) conveying UE-specific information may also be transmitted in the common search space. The UE-specific search space supports a PDCCH having a CCE aggregation level of {1, 2, 4, 8}.

The following Table 1 represents the number of PDCCH candidates to be monitored by the wireless device.

TABLE 1

| Search Space Type | Aggregation level L | Size [In CCEs] | Number of PDCCH candidates | DCI formats |
| --- | --- | --- | --- | --- |
| UE-specific | 1 | 6 | 6 | 0, 1, 1A, 1B, 1D, 2, 2A |
|  | 2 | 12 | 6 |  |
|  | 4 | 8 | 2 |  |
|  | 8 | 16 | 2 |  |
| Common | 4 | 16 | 4 | 0, 1A, 1C, 3/3A |
|  | 8 | 16 | 2 |  |

The size of search space is determined by Table 1 above, and different start points of search space are defined for the common search space and the UE-specific search space, respectively. The start point of the common search space is fixed irrespective of subframes, whereas the start point of the UE-specific search space may vary depending on UE identifiers (e.g., C-RNTI), CCE aggregation levels, and/or slot numbers in the radio frame. In case the start point of the UE-specific search space is positioned in the common search space, the UE-specific search space may overlap the common search space.

In aggregation level $L \in \{1,2,3,4\}$, search space $S^{(L)}_k$ is defined as a PDCCH candidate set. The CCE corresponding to PDCCH candidate m in search space $S^{(L)}_k$ is given as follows:

$$L \cdot \{(Y_k + m') \bmod \lfloor N_{CCE,k}/L \rfloor\} + i \qquad \text{[Equation 1]}$$

Here, $i=0, 1, \ldots, L-1$, $m=0, \ldots, M^{(L)}-1$, $N_{CCE,k}$ is the total number of CCEs that may be used for transmission of PDCCH in the control region of subframe k. The control region contains a set of CCEs numbered 0 to $N_{CCE,k}-1$. $M^{(L)}$ is the number of PDCCH candidates in CCE aggregation level L in the given search space.

If a CIF (carrier indicator field) is set to the wireless device, $m' = m + M^{(L)} n_{cif}$. $n_{cif}$ is a CIF value. If no CIF is set to the wireless device, $m' = m$.

In the common search space, $Y_k$ is set as 0 for two aggregation levels, L=4 and L=8.

In the UE-specific search space of aggregation level L, variable $Y_k$ is defined as follows:

$$Y_k = (A \cdot Y_{k-1}) \bmod D \qquad \text{[Equation 2]}$$

Here, $Y_{-1} = n_{RNTI} \neq 0$, A=39827, D=65537, $k = \text{floor}(n_s/2)$, and $n_s$ is a slot number in the radio frame.

When the wireless device monitors the PDCCH based on C-RNTI, a DCI format to be monitored is determined depending on the transmission mode of the PDSCH. The following table shows an example of monitoring a PDCCH having a C-RNTI configured.

TABLE 2

| Transmission mode | DCI format | Search space | Transmission mode of PDSCH according to PDCCH |
|---|---|---|---|
| Mode 1 | DCI format 1A | common and UE-specific | single antenna port, port 0 |
| | DCI format 1 | UE-specific | single antenna port, port 0 |
| Mode 2 | DCI format 1A | common and UE-specific | transmit diversity |
| | DCI format 1 | UE-specific | transmit diversity |
| Mode 3 | DCI format 1A | common and UE-specific | transmit diversity |
| | DCI format 2A | UE-specific | CDD(Cyclic Delay Diversity) or transmit diversity |
| Mode 4 | DCI format 1A | common and UE-specific | transmit diversity |
| | DCI format 2 | UE-specific | closed-loop spatial multiplexing |
| Mode 5 | DCI format 1A | common and UE-specific | transmit diversity |
| | DCI format 1D | UE-specific | MU-MIMO(Multi-user Multiple Input Multiple Output) |
| Mode 6 | DCI format 1A | common and UE-specific | transmit diversity |
| | DCI format 1B | UE-specific | closed-loop spatial multiplexing |
| Mode 7 | DCI format 1A | common and UE-specific | If the number of PBCH transmission ports is 1, single antenna port, otherwise, port 0, or transmit diversity |
| | DCI format 1 | UE-specific | single antenna port, port 5 |
| Mode 8 | DCI format 1A | common and UE-specific | If the number of PBCH transmission ports is 1, single antenna port, otherwise, port 0, or transmit diversity |
| | DCI format 2B | UE-specific | Dual layer transmission (port 7 or 8), or single antenna port, port 7 or 8 |

The purposes of the DCI format are classified as follows:

TABLE 3

| DCI format | Details |
|---|---|
| DCI format 0 | Used for PUSCH scheduling |
| DCI format 1 | Used for scheduling of one PDSCH codeword |
| DCI format 1A | Used for compact scheduling of one PDSCH codeword and random access process |
| DCI format 1B | Used for compact scheduling of one PDSCH codeword having precoding information |
| DCI format 1C | Used for very compact scheduling of one PDSCH codeword |
| DCI format 1D | Used for compact scheduling of one PDSCH codeword having precoding and power offset information |
| DCI format 2 | Used for PDSCH scheduling of UEs set in closed-spatial multiplexing mode |
| DCI format 2A | Used for PDSCH scheduling of UEs set in open-loop spatial multiplexing mode |
| DCI format 3 | Used for transmission of TPC command of PUCCH and PUSCH having two-bit power adjustment |
| DCI format 3A | Used for transmission of TPC command of PUCCH and PUSCH having one-bit power adjustment |

Figure 4:
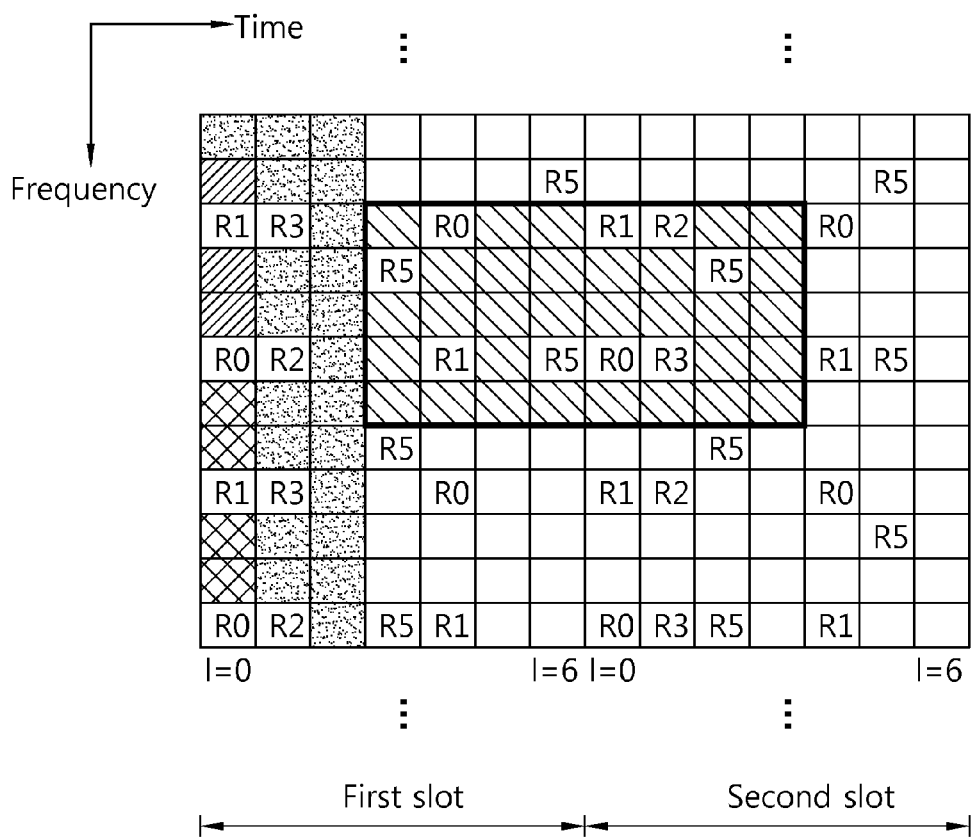
FIG. 4 is a view illustrating an example in which a reference signal and a control channel are arranged in a 3GPP LTE DL subframe.

FIG. 4 shows an example in which in the 3GPP LTE DL subframe a reference signal and a control channel are arranged.

The control region (or PDCCH region) includes first three OFDM symbols, and the data region where a PDSCH is transmitted includes the remaining OFDM symbols.

In the control region, a PCFICH, a PHICH and/or a PDCCH is transmitted. The CIF of the PCFICH indicates three OFDM symbol. In the control region, the part except for the resource where the PCFICH and/or PHICH is transmitted becomes a PDCCH region for monitoring the PDCCH.

Various reference signals are transmitted in the subframe.

A CRS (cell-specific reference signal) may be received by all the wireless devices in the cell and is transmitted over the entire downlink band. In the drawings, 'R0' indicates an RE (resource element) where a CRS for the first antenna port is transmitted, 'R1' an RE where a CRS for the second antenna port is transmitted, 'R2' an RE where a CRS for the third antenna port is transmitted, and 'R3' an RE where a CRS for the fourth antenna port is transmitted.

The RS sequence for a CRS is defined as follows:

$$r_{l,ns}(m) = \frac{1}{\sqrt{2}}(1 - 2 \cdot c(2m)) + j\frac{1}{\sqrt{2}}(1 - 2 \cdot c(2m+1))$$ [Equation 3]

Here, $m = 0, 1, \ldots, 2N_{maxRB} - 1$, $N_{maxRB}$ is the maximum number of RBs, ns is a slot number in the radio frame, and l is an OFDM symbol number in the slot.

A pseudo-random sequence, $c(i)$, is defined by the following gold sequence having a length of 31.

$$c(n) = (x_1(n+Nc) + x_2(n+Nc)) \bmod 2$$

$$x_1(n+31) = (x_1(n+3) + x_1(n)) \bmod 2$$

$$x_2(n+31) = (x_2(n+3) + x_2(n+2) + x_2(n+1) + x_2(n)) \bmod 2$$ [Equation 4]

Here, Nc=1600, and the first m-sequence is initialized as $x_1(0)=1$, $x_1(n)=0$, $m=1, 2, \ldots, 30$.

The second m-sequence is initialized as $c_{init} = 2^{10}(7(ns+1) + l+1)(2N^{cell}_{ID}+1) + 2N^{cell}_{ID} + N_{CP}$ at the beginning of each OFDM symbol. $N^{cell}_{ID}$ is a cell's PCI (physical cell identity), where $N_{CP}=1$ in normal CP and $N_{CP}=0$ in extended CP.

In the subframe, a URS (UE-specific reference signal) is transmitted. Although the CRS is transmitted over the entire subframe, the URS is transmitted in the data region of the subframe and is used for demodulation of a corresponding PDSCH. In the drawings, 'R5' indicates an RE where a URS is transmitted. The URS is also referred to as a DRS (dedicated reference signal) or DM-RS (demodulation reference signal).

A URS is transmitted only in an RB where a corresponding PDSCH is mapped. In the drawings, although a region other than the region where a PDSCH is transmitted is also marked R5, this is for indicating the position of the RE where the URS is mapped.

A URS is used only by wireless device(s) that receive a PDSCH. The RS sequence $r_{ns}(m)$ for US is the same as Equation 3. At this time, $r_{ns}(m)$, and $N_{PDSCH,RB}$ is the number of RBs in the corresponding PDSCH transmission. A pseudo-random sequence generator is initialized as $c_{init}$=(floor(ns/2)+1)(2N$^{cell}_{ID}$+1)2$^{16}$+n$_{RNTI}$ at the beginning of each subframe. n$_{RNTI}$ is an identifier of wireless device.

The above example represents the case where a URS is transmitted through a single antenna, and when a URS is transmitted through multiple antennas, the pseudo-random number generator is initialized as $c_{init}$=(floor(ns/2)+1)(2N$^{cell}_{ID}$+1)2$^{16}$+n$_{SCID}$ at the beginning of each subframe. n$_{SCID}$ is a parameter obtained from a DL grant (for example, DCI format 2B or 2C) related with PDSCH transmission.

The URS supports MIMO (multiple input multiple output) transmission. Depending on antenna port or layer, an RS sequence for URS may spread in a spread sequence as follows:

TABLE 4

| layer | [w(0) w(1) w(2) w(3)] |
|---|---|
| 1 | [+1 +1 +1 +1] |
| 2 | [+1 −1 +1 −1] |
| 3 | [+1 +1 +1 +1] |
| 4 | [+1 −1 +1 −1] |
| 5 | [+1 +1 −1 −1] |
| 6 | [−1 −1 +1 +1] |
| 7 | [+1 −1 −1 +1] |
| 8 | [−1 +1 +1 −1] |

The layer may be defined as an information path for entry to the precoder. The rank is the number of non-zero eigenvalues in the MIMO channel matrix and is the same as the number of layers or the number of space streams. The layer may correspond to an antenna port distinguishing URSs and/or a spread sequence applied to the URS.

Figure 5:
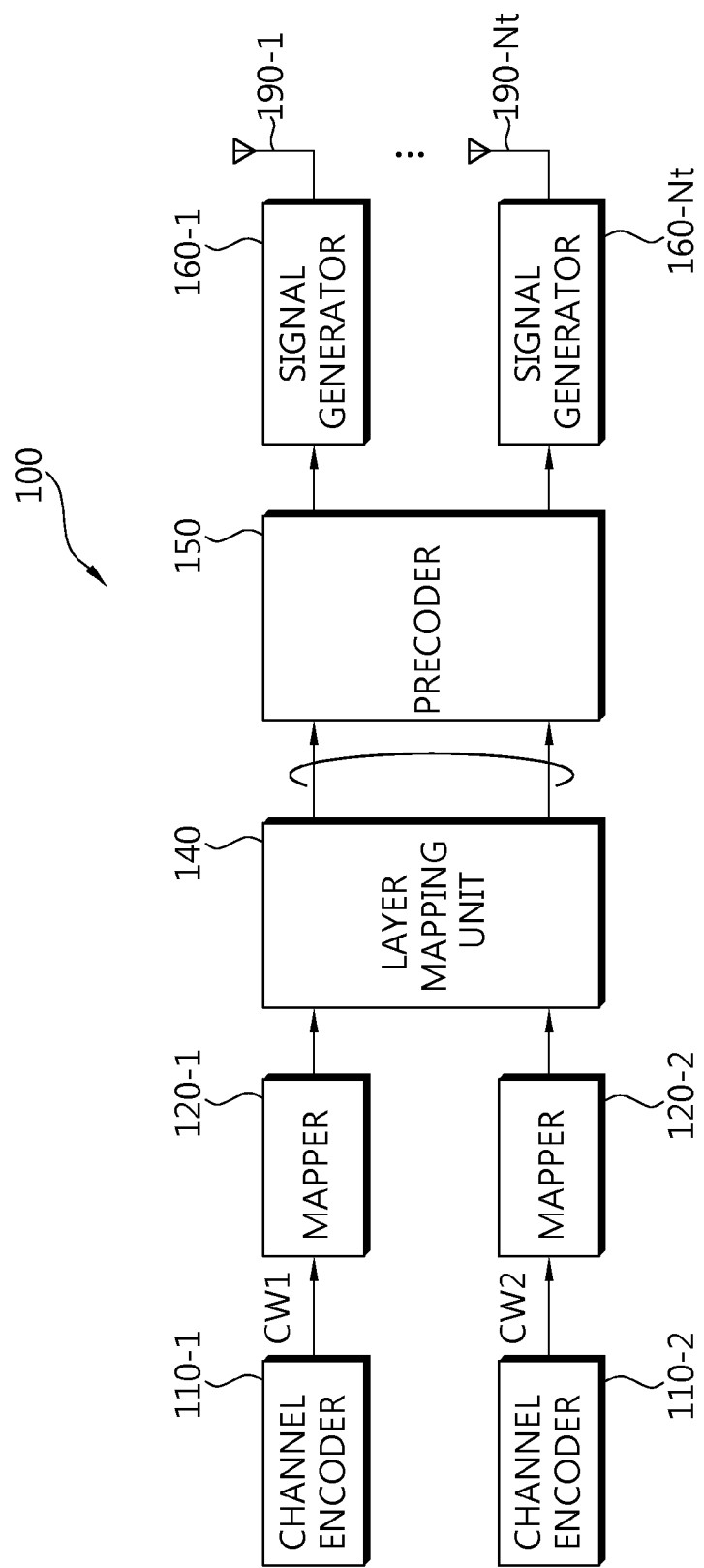
FIG. 5 shows an example transmitter having multiple antennas.

FIG. 5 shows an example transmitter having multiple antennas.

The first electronic device 100 includes channel encoders 110-1 and 110-2, mappers 120-1 and 120-2, a layer mapping unit 140, a precoder 150, and a signal generator 160-1, ..., 160-Nt. Nt is the number of antenna ports. The channel encoders 110-1 and 110-2 encode input information bits according to a predetermined coding scheme and generate codewords. The first channel encoder 110-1 generates a first codeword CW1, and the second channel encoder 110-2 generates a second codeword.

The mappers 120-1 and 120-2 modulate each codeword according to a modulation scheme and map it with modulation symbols having modulation values. There is no limit on a specific modulation scheme, and m-PSK(m-Phase Shift Keying) or m-QAM(m-Quadrature Amplitude Modulation) may be used. For example, m-PSK may be BPSK, QPSK or 8-PSK. m-QAM may be 16-QAM, 64-QAM or 256-QAM. The first mapper 120-1 generates modulation symbols for the first codeword CW1, and the second mapper 120-2 generates modulation symbols for the second codeword CW2.

Although the transmitter 100 for processing two codewords include two channel encoders 110-1 and 110-2 and two mappers 120-1 and 120-2, the number of channel encoders and mappers included in the transmitter 100 is not limited. The transmitter 100 may contain at least one mapper and at least one channel encoder for processing at least one codeword.

The layer mapping unit 140 maps input modulation symbols of the codewords CW1 and CW2 to each layer depending on the number of layers. The layer mapping unit 140 may determine the number of layers (i.e., rank) and may then map the modulation symbols of each codeword to each layer.

The precoder 150 processes the mapping symbol mapped to each layer in an MIMO scheme based on a plurality of antenna ports 170-1, ..., 170-Nt, thereby outputting an antenna specific symbol. The signal generator 160-1, ..., 160-Nt converts the antenna specific symbol to a transmission signal that is then transmitted through each antenna port 190-1, ..., 190-Nt. The signal generator 160-1, ..., 160-Nt may generate a transmission signal by OFDM modulation or other schemes, such as SC-FDMA modulation, which are well known to one of ordinary skill in the art.

According to 3GPP TS 36.211 V10.2.0 (2011-06), Ch. 6.3, in 3GPP LTE, modulation symbols $d^{(q)}(0), \ldots, d^{(q)}(M^{(q)}_{symb}-1)$ for codeword q are mapped to layer $x(i)=[x^{(0)}(i) \ldots x^{(v-1)}(i)]^T$ ($i=0, 1, \ldots, M^{layer}_{symb}-1$). Here, $M^{(q)}_{symb}$ is the number of modulation symbols for codeword q, u the number of layers, and $M^{layer}_{symb}$ the number of modulation symbols per layer. Although 3GPP LTE supports up to eight layers, an example of codeword-to-layer mapping for four layers is shown as follows.

TABLE 5

| Number of layers | Number of codewords | Codeword-to-layer mapping $i = 0, 1, \ldots, M^{layer}_{symb} - 1$ | |
|---|---|---|---|
| 1 | 1 | $x^{(0)}(i) = d^{(0)}(i)$ | $M^{layer}_{symb} = M^{(0)}_{symb}$ |
| 2 | 1 | $x^{(0)}(i) = d^{(0)}(2i)$ $x^{(1)}(i) = d^{(0)}(2i + 1)$ | $M^{layer}_{symb} = M^{(0)}_{symb}/2$ |
| 2 | 2 | $x^{(0)}(i) = d^{(0)}(i)$ $x^{(1)}(i) = d^{(1)}(i)$ | $M^{layer}_{symb} = M^{(1)}_{symb} = M^{(1)}_{symb}$ |
| 3 | 1 | $x^{(0)}(i) = d^{(0)}(3i)$ $x^{(1)}(i) = d^{(0)}(3i + 1)$ $x^{(2)}(i) = d^{(0)}(3i + 2)$ | $M^{layer}_{symb} = M^{(0)}_{symb}/3$ |
| 3 | 2 | $x^{(0)}(i) = d^{(0)}(i)$ $x^{(1)}(i) = d^{(1)}(2i)$ $x^{(2)}(i) = d^{(1)}(2i + 1)$ | $M^{layer}_{symb} = M^{(0)}_{symb} = M^{(1)}_{symb}/2$ |
| 4 | 1 | $x^{(0)}(i) = d^{(0)}(4i)$ $x^{(1)}(i) = d^{(0)}(4i + 1)$ $x^{(2)}(i) = d^{(0)}(4i + 2)$ $x^{(3)}(i) = d^{(0)}(4i + 3)$ | $M^{layer}_{symb} = M^{(0)}_{symb}/4$ |
| 4 | 2 | $x^{(0)}(i) = d^{(0)}(2i)$ $x^{(1)}(i) = d^{(0)}(2i + 1)$ $x^{(2)}(i) = d^{(1)}(2i)$ $x^{(3)}(i) = d^{(1)}(2i + 1)$ | $M^{layer}_{symb} = M^{(0)}_{symb}/2 = M^{(1)}_{symb}/2$ |

In order to maintain inter-layer orthogonality upon spatial multiplexing in 3GPP LE, antenna ports and scrambling identifies (SCIDs) as shown in Table 5 are used. The SCID may correspond to $n_{SCID}$ used for initializing the above-described URS. According to the following table, up to two codewords may be transmitted.

TABLE 6

| 1 codeword | | 2 codewords | |
|---|---|---|---|
| Value | Message | Value | message |
| 0 | 1 layer, port 7, $n_{SCID}$ = 0 | 0 | 2 layers, ports 7-8, $n_{SCID}$ = 0 |
| 1 | 1 layer, port 7, $n_{SCID}$ = 1 | 1 | 2 layers, ports 7-8, $n_{SCID}$ = 1 |
| 2 | 1 layer, port 8, $n_{SCID}$ = 0 | 2 | 3 layers, ports 7-9 |
| 3 | 1 layer, port 8, $n_{SCID}$ = 1 | 3 | 4 layers, ports 7-10 |
| 4 | 2 layers, ports 7-8 | 4 | 5 layers, ports 7-11 |
| 5 | 3 layers, ports 7-9 | 5 | 6 layers, ports 7-12 |
| 6 | 4 layers, ports 7-10 | 6 | 7 layers, ports 7-13 |
| 7 | reserved | 7 | 8 layers, ports 7-14 |

Meanwhile, a PDCCH is monitored in a limited region, i.e., control region, in the subframe, and a CRS transmitted over the whole band is used for modulating the PDCCH. As the type of control information is diversified and the amount of control information increases, scheduling flexibility cannot be achieved solely with the existing PDCCH. Further, to lessen the burden due to CRS transmission, an introduction of EPDCCH (enhanced PDCCH) is being discussed.

Figure 6:
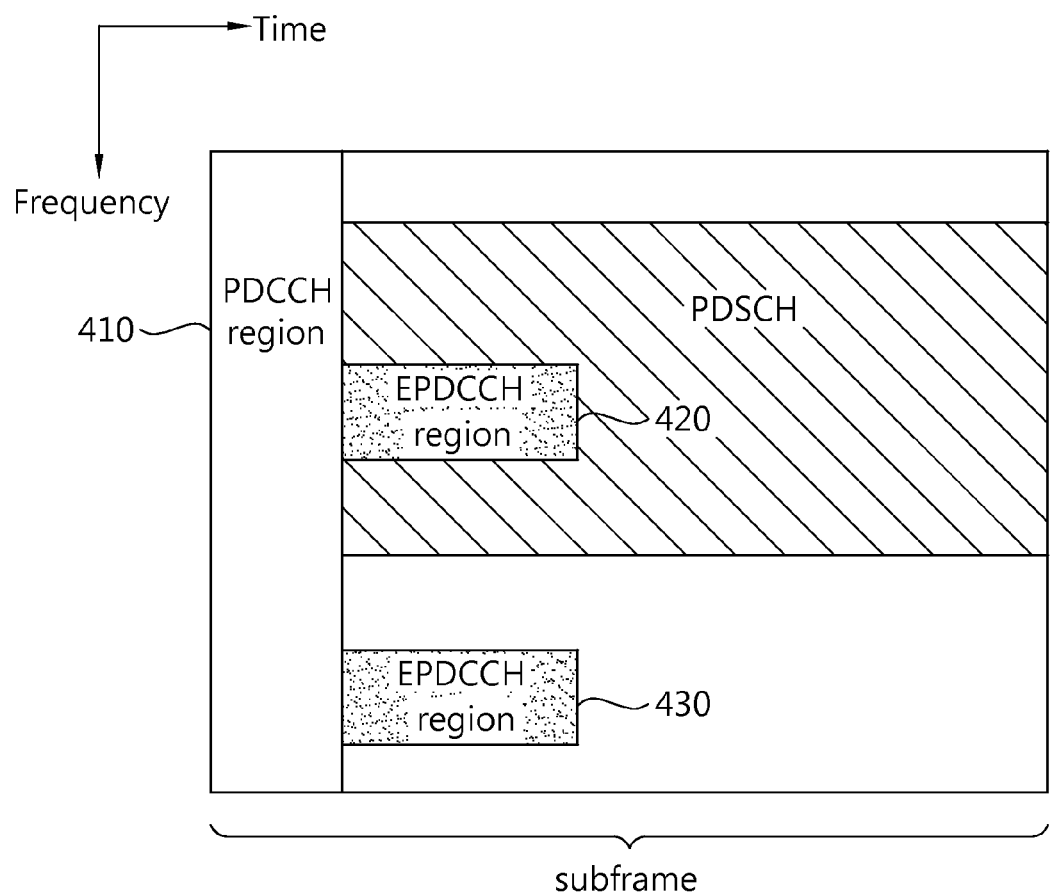
FIG. 6 shows an example subframe having an EPDCCH.

FIG. 6 shows an example subframe having an EPDCCH.

The subframe may include zero or one PDCCH region 410 and zero or more EPDCCH regions 420 and 430.

The EPDCCH regions 420 and 430 are a region where the wireless device monitors an EPDCCH. The PDCCH region 410 is positioned in up to first four OFDM symbols in the subframe, but the EPDCCH regions 420 and 430 may be flexibly scheduled in the OFDM symbols subsequent to the PDCCH 410.

The wireless device may be assigned one or more EPDCCH regions 420 and 430, and the wireless device may monitor the EPDCCH in the assigned EPDCCH regions 420 and 430.

The number/position/size of the EPDCCH regions 420 and 430 and/or information on the subframe for monitoring the EPDCCH may be provided from a base station to the wireless device through, e.g., an RRC message.

In the PDCCH region 410, a PDCCH may be demodulated based on a CRS. In the EPDCCH regions 420 and 430, a DM (demodulation) RS, not CRS, may be defined for demodulating the EPDCCH. An associated DM RS may be transmitted in its corresponding EPDCCH region 420 or 430.

The RS sequence $r_{ns}(m)$ for the associated DM RS is the same as Equation 3. At this time, $m=0, 1, \ldots, 12N_{RB}-1$ and, $N_{RB}$ is the maximum number of RBs. The pseudo-random number generator may be initialized as $c_{init}=(\text{floor}(ns/2)+1)(2N_{EPDCCH,ID}+1)2^{16}+n_{EPDCCH,SCID}$ at the beginning of each subframe. ns is a slot number in the radio frame, $N_{EPDCCH,ID}$ a cell index associated with a corresponding EPDCCH region, and $n_{EPDCCH,SCID}$ a parameter given by upper layer signaling.

Each EPDCCH region 420 and 430 may be used for scheduling different cells. For example, the EPDCCH in the EPDCCH region 420 may carry scheduling information for a first cell and the EPDCCH in the EPDCCH region 430 may carry scheduling information for a second cell.

When the EPDCCHs in the EPDCCH regions 420 and 430 are transmitted through multiple antennas, the DM RSs in the EPDCCH regions 420 and 430 may be applied the same precoding as the EPDCCH.

In comparison with the PDCCH using CCE as a unit of transmission resource, the unit of transmission resource for EPDCCH is denoted ECCE (Enhanced Control Channel Element). An aggregation level may be defined each resource that monitors EPDCCH. For example, when one ECCE is the minimum resource for EPDCCH, an aggregation level may be defined as L={1, 2, 4, 8, 16}.

Although EPDCCH is in discussion as supporting single layer transmission, no multi-layer transmission is disclosed.

Hereinafter, EPDCCH transmission using spatial multiplexing is suggested. A method is proposed of being capable of transmitting a plurality of UL/DL grants with the minimal interference in the different layers even when transmitted in the same time-frequency radio resource. Scheduling flexibility and resource efficiency may be increased by allowing a plurality of EPDCCHs carrying a plurality of UL/DL grants to be transmitted in the same time-frequency radio resource.

Hereinafter, search space may correspond to an EPDCCH region. In the search space, one or more EPDCCH candidates may be monitored per one or more aggregation levels.

Figure 7:
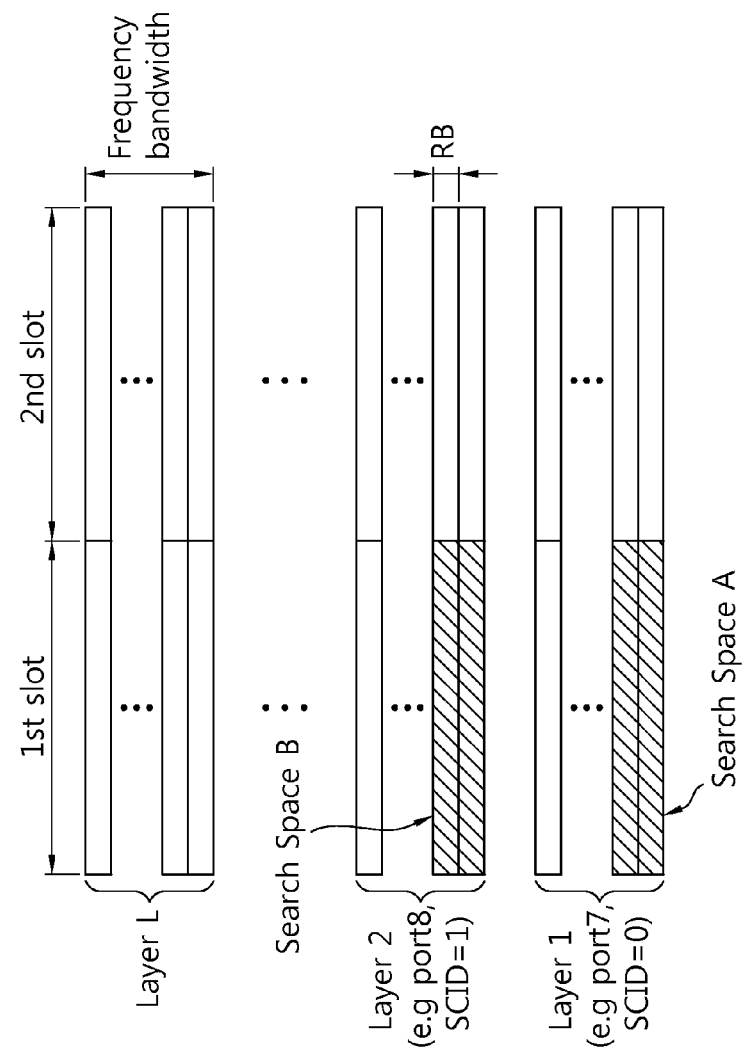
FIG. 7 shows an example of configuring a search space according to an embodiment of the present invention.

FIG. 7 shows an example of configuring a search space according to an embodiment of the present invention.

An example is shown in which there are L layers, search space A is arranged on layer 1 (antenna port 7, SCID=0), and search space B is arranged on layer 2 (antenna port 8, SCID=1). The number of layers and the number of search spaces are merely an example. The antenna port and SCID value of each layer is also given as an example.

Search spaces A and B may be arranged on a plurality of layers, not on a single layer. For example, search space A may be arranged on layers 1 and 2, and search space B may be arranged on layers 3 and 4.

The EPDCCH of search space A may carry DCI format 1A or DCI format 0 having the same size as DCI format 1A. The EPDCCH of search space B may carry a DCI format (e.g., DCI format dependent upon a transmission mode) different from the EPDCCH of search space A.

Although search space A and search space B are arranged in the first slot of the subframe, this is merely an example. Search space A and search space B may be arranged in the second slot of the subframe or over both the first and second slots.

If a search space is arranged in the first slot, earlier decoding is possible, and processing requirements of the wireless device may be mitigated.

Depending on DCI formats, a specific search space or specific layer may be designated. For example, a search space of an EPDCCH for a fall back DCI format (e.g., DCI format 1A) may be pre-designated to be transmitted through the first layer. Or, the base station may inform the wireless device of the layer through which a search space is transmitted depending on DCI formats.

There may be various combinations to define a search space depending on DCI formats. The following table, Table 6, shows an example of DCI formats to be searched in search spaces A and B. A subframe is split into two parts, each having an EPDCCH that may deliver a DCI format different from that of the other part. The two parts may be defined by various methods, such as, e.g., set of two sub-carriers or two slots.

TABLE 7

| Configuration | | First part | Second part |
|---|---|---|---|
| 1 | search space A | DCI format 1A/0 | |
|   | search space B | DCI format X | |
| 2 | search space A | DCI format 1A | DCI format 0/Y |
|   | search space B | DCI format X | |

TABLE 7-continued

| Configuration | | First part | Second part |
|---|---|---|---|
| 3 | search space A | DCI format 1A/0 | DCI format X |
|   | search space B | DCI format 1A/0 | DCI format Y |
| 4 | search space A | DCI format 1A | DCI format 0 |
|   | search space B | DCI format X | DCI format Y |
| 5 | search space A | DCI format 1A/0 | DCI format 1A/0 |
|   | search space B | DCI format X/Y | DCI format X/Y |
| 6 | search space A | DCI format 1A/0/X(partial) | DCI format 1A/0/Y(partial) |
|   | search space B | DCI format X/Y | DCI format X/Y |
| 7 | search space A | DCI format 1A/0/X(partial) | DCI format 1A/0/Y(partial) |
|   | search space B | DCI format X/Y | DCI format X/Y |

In the above table, DCI format X indicates one or more specific DCI formats (e.g., transmission mode-dependent DCI format, etc.), and DCI format Y indicates a UL scheduling-related DCI format.

Figure 8:
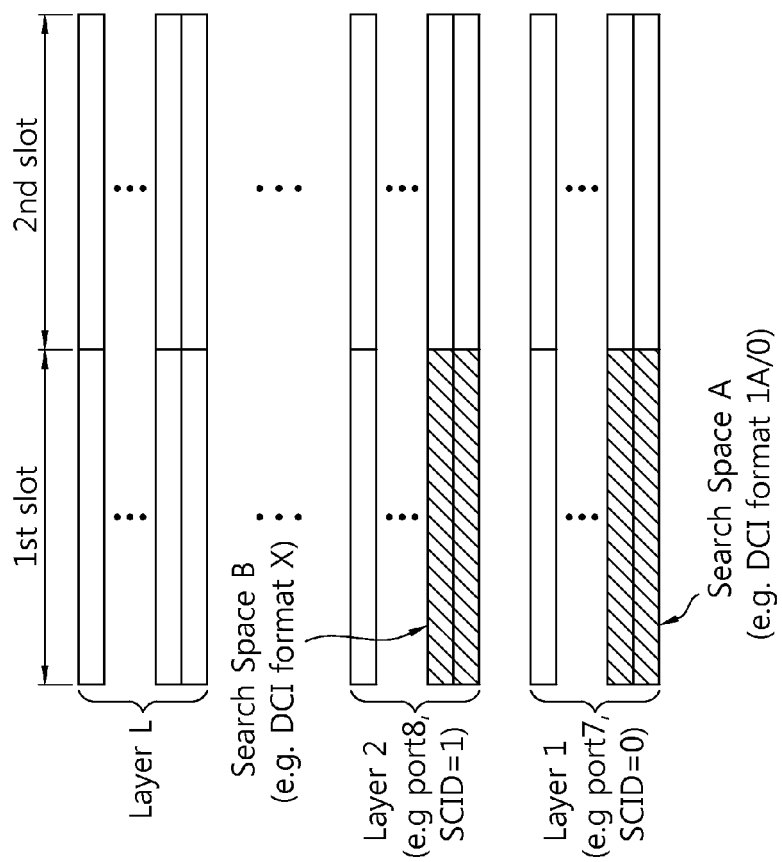
FIG. 8 shows an example of application of configuration 1 in Table 6.

FIG. 8 shows an example of application of configuration 1 in Table 6.

Meanwhile, a DCI format may be split into two or more segments, so that a first segment is monitored in search space A, and a second segment is monitored in search space B.

Different pluralities of segments may apply depending on CW (codeword)-to-layer mapping configurations. Assuming that a DCI constitutes a plurality of codewords having a first codeword (hereinafter, CW1) mapped with layer 1 and layer 2 and a second codeword (hereinafter, CW2) mapped with layer 3 and layer 4, search space A and search space B may be arranged on layer 1/2 and layer 3/4, respectively.

Or, a DCI may include various fields, some of which may be split into segments. For example, according to 3GPP TS 36.212 V10.2.0, Ch. 5.3.3.1.3, DCI format 1A includes the following fields.

Carrier indicator
Flag for format0/format1A differentiation
Localized/Distributed VRB assignment flag
Resource block assignment
Modulation and coding scheme
HARQ process number
New data indicator
Redundancy version
TPC command for PUCCH
Downlink Assignment Index
SRS request The fields in DCI format 1A may be split into two segments. There is no limit on references for splitting. Some fields may be prioritized so that a field having a higher priority is included in the first segment that is then monitored in a specific search space.

Information necessary for decoding, such as rank information or SCID, may be determined to have a higher priority. The wireless device attempts to first decode the first segment of DCI format 1A/0 in the first layer search space A assuming rank R (e.g., R=1). The wireless device may try to conduct decoding on the second segment in search space B based on the decoded information.

In order to more efficiently configure a search space, it may be more advantageous to design DCI format X/Y to the same size as DCI format 1A/0 because a decoding process may be carried out substantially once, and subsequent DCI formats 1A/0/X-A may be subjected to simple CRC check, thereby able to determine a final DCI format.

Figure 9:
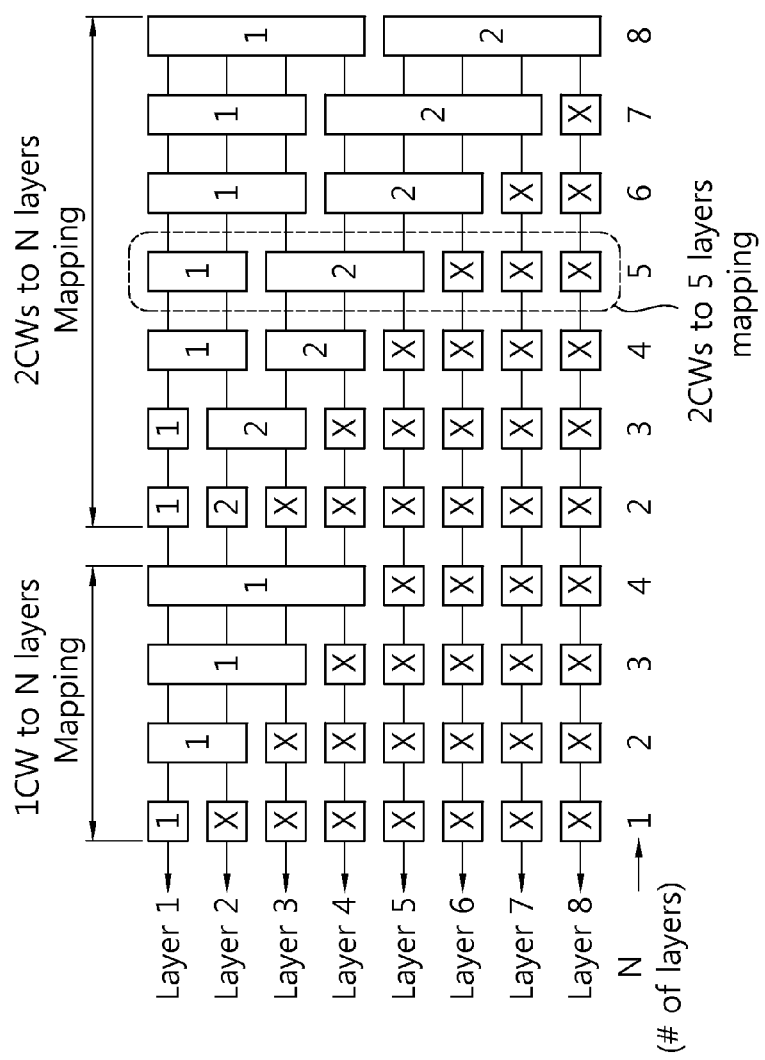
FIG. 9 shows an existing PDSCH's CW-to-layer mapping.

FIG. 9 shows CW-to-layer mapping of an existing PDSCH.

This is an illustration of the CW-to-layer mapping shown in Table 4. In FIG. 9, 'X' denotes a corresponding layer being not used.

Figure 10:
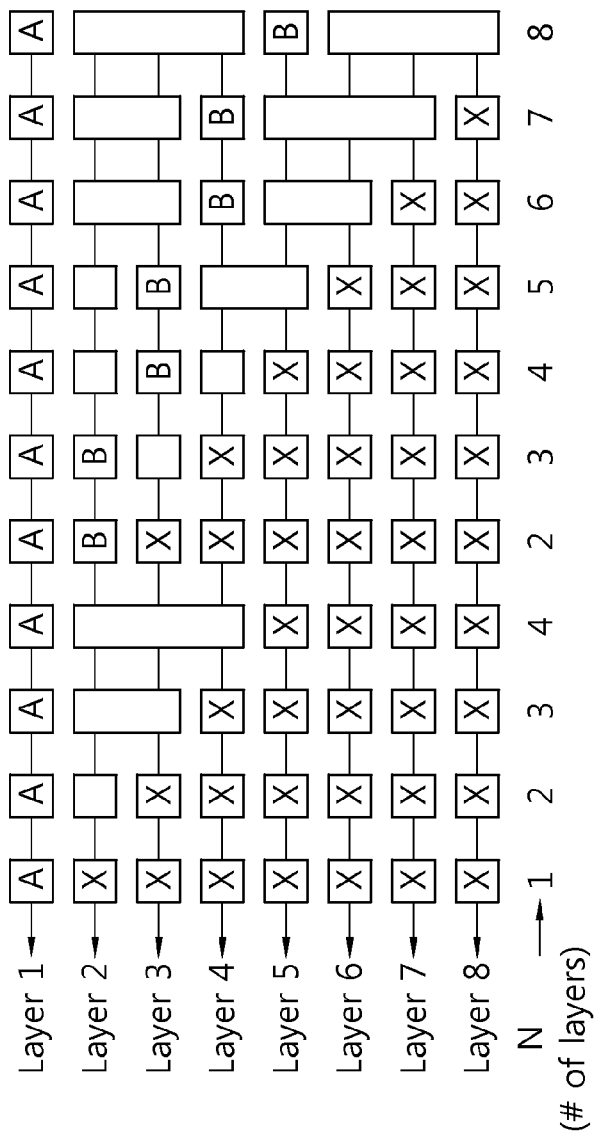
FIG. 10 shows search space-to-layer mapping according to an embodiment of the present invention.

FIG. 10 shows search space-to-layer mapping according to an embodiment of the present invention.

In FIG. 10, 'A' denotes search space A, 'B' search space B, and 'X' a corresponding layer being not used.

Search spaces A and B each are arranged on a single layer. PDSCH CW-to-layer mapping applies. Search space A is arranged on a lowest layer mapped with CW1 (i.e., a layer having the smallest index), and search space B is arranged on a lowest layer mapped with CW2.

For example, when rank is 6, search space A is arranged on layer 1, and search space B is arranged on layer 4.

A precoding vector for a search space may use the same one as the PDSCH.

Or, when a search space associated with a PDSCH is configured, assuming a rank for EPDCCH is different from a rank from PDSCH, different precoding vectors may be used. For example, although a PDSCH performs a rank adaptation according to channels, an EPDCCH may apply a rank 2 precoding vector to search spaces A and B always assuming rank 2 transmission.

Figure 11:
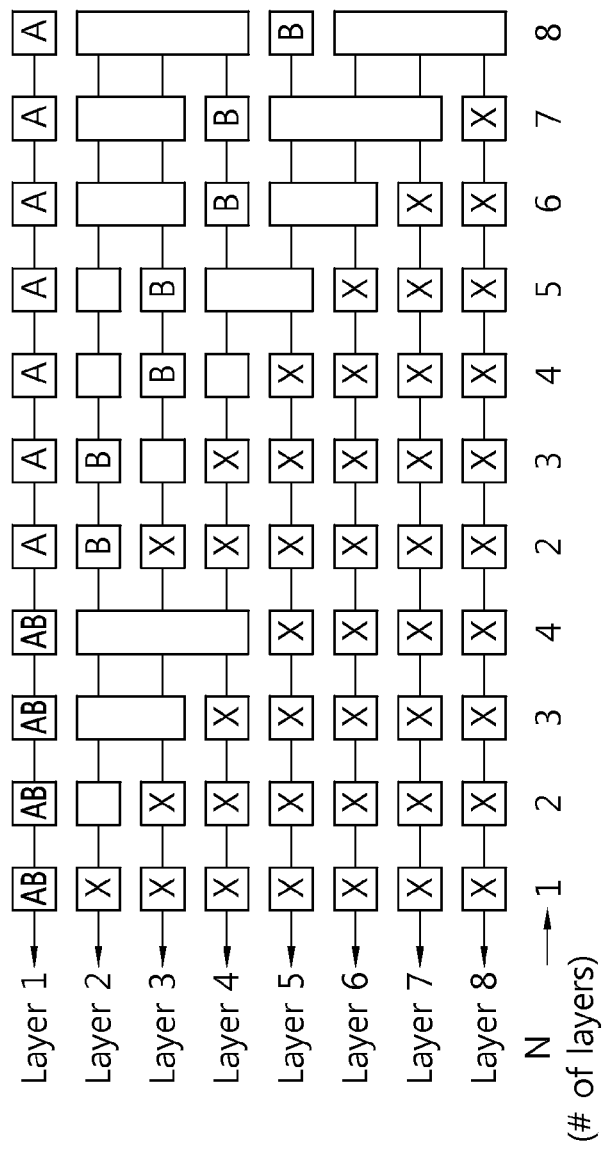
FIG. 11 shows search space-to-layer mapping according to another embodiment of the present invention.

FIG. 11 shows search space-to-mapping according to another embodiment of the present invention.

In FIG. 11, 'AB' denotes search spaces A and B, 'A' search space A, 'B' search space B, and 'X' a corresponding layer being not used.

In a specific rank, search spaces A and B both may be shown to be arranged on a single layer. There are two search spaces, and once CW1 is configured, the two search spaces are arranged on a lowest layer mapped with CW1. If CW1 and CW2 are configured, search space A is arranged on a lowest layer mapped with CW1 and search space B is arranged on a lowest layer mapped with CW2.

Figure 12:
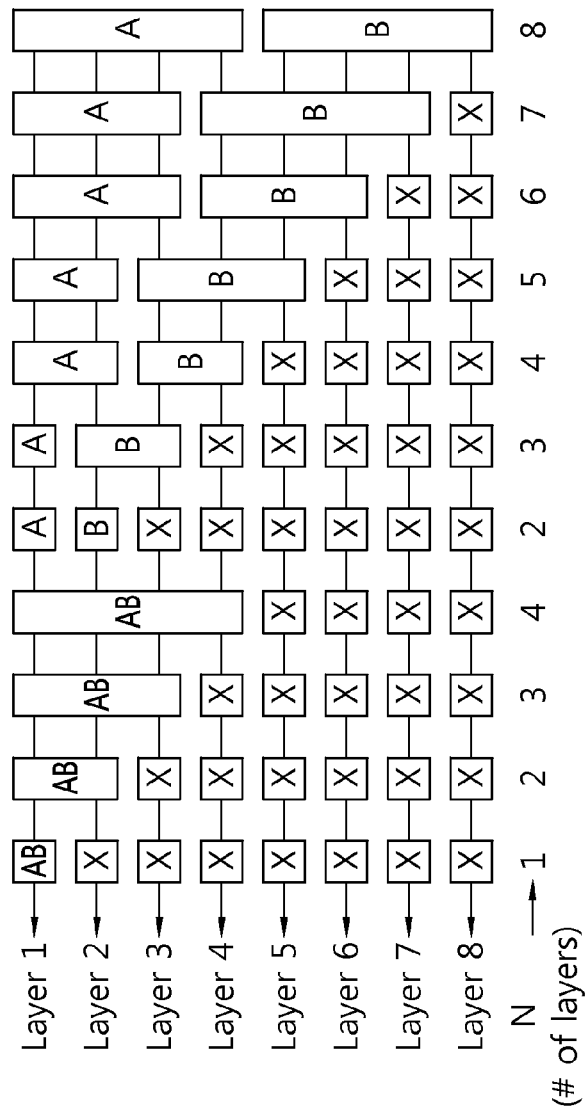
FIG. 12 shows search space-to-layer mapping according to still another embodiment of the present invention.

FIG. 12 shows search space-to-layer mapping according to another embodiment of the present invention.

This shows an example where a search space is arranged over a plurality of layers.

There are two search spaces, and once CW1 is configured, the two search spaces are arranged on all layers mapped with CW1. If CW1 and CW2 are configured, search space A is arranged on all layers mapped with CW1, and search space B is arranged on all layers mapped with CW2.

For example, when 2 CW transmission is configured, and rank is 6, search space A is mapped with layers 1 to 3, and search space B is mapped with layers 4 to 6.

Meanwhile, in case a DMRS associated with EPDCCH is used, antenna ports 11 to 14, unlike antenna ports 7 to 10, are spread by an orthogonal cover sequence over two slots. Accordingly, if an EPDCCH is decoded based on one slot, defining new layer mapping may be more advantageous than using the existing CW-to-layer mapping.

Figure 13:
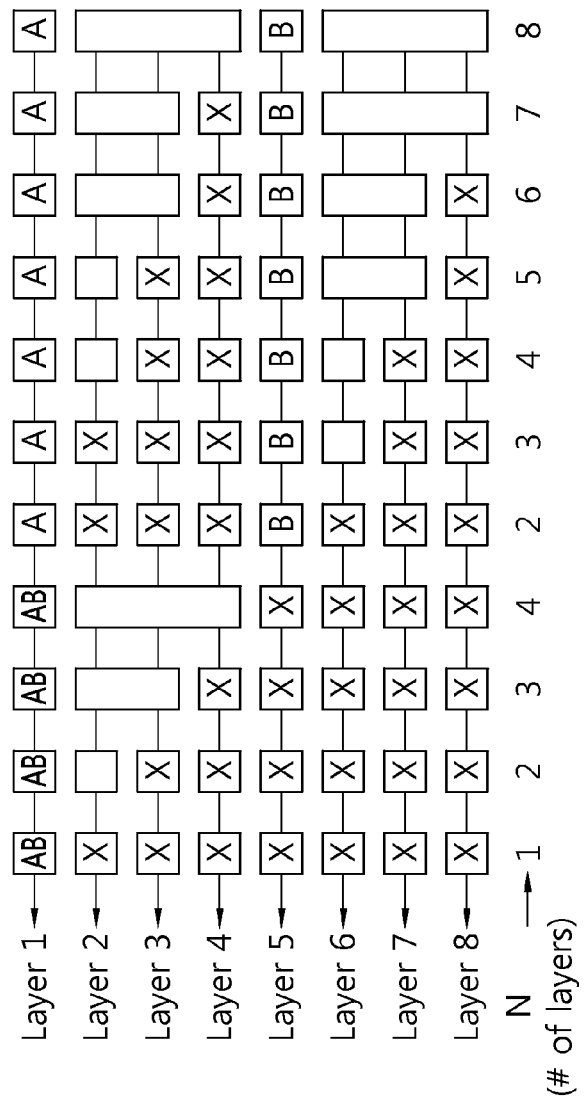
FIG. 13 shows search space-to-layer mapping according to yet still another embodiment of the present invention.

FIG. 13 shows search space-to-layer mapping according to another embodiment of the present invention.

This is to define search space-to-layer mapping that allows a layer mapped with a search space to be fixed even when rank is varied.

There are two search spaces, and if CW1 is configured, the search spaces are arranged on layers 1 and 2. If CW1 and CW2 are configured, search space A is arranged on layer 1 mapped with CW1, and search space B is arranged on layer 5.

The above-described embodiments may be implemented alone or in combination. For example, a specific subframe is applied with the embodiment described above in connection with FIG. 10, and other subframe may be applied with the embodiment described above in connection with FIG. 11.

In the above-described embodiment, search space A may be deemed with the concept of a fallback search space. First, an EPDCCH is monitored with a highest priority put to search space A, and other search spaces may be then monitored. The DCI detected from search space A may have a higher priority than the DCIs detected form the other search spaces or may override the DCIs.

In the above-described embodiment, search space A and search space B may be transmitted through time/frequency radio resources overlapping each other in part or whole. Search space A and search space B may be transmitted through different antenna ports.

In the above-described embodiment, when a plurality of search spaces are mapped with one layer, the plurality of search spaces may be distinguished from each other by an SCID or orthogonal sequence.

According to aggregation levels, a search space may be mapped with a plurality of layers, not a single layer. For example, a search space with aggregation level 1 is mapped with a first layer. A search space with aggregation level 2 is mapped with the first layer and a second layer. A first ECCE is mapped with the first layer, and a second ECCE is mapped with the second layer. Likewise, a search space with aggregation level 4 may be mapped with one of the first layer to a fourth layer.

In such case, the start points of the search spaces are the same irrespective of the size of aggregation level. In general, a larger aggregation level is used only when there is a problem with EPDCCH decoding performance due to its low channel quality. However, a method as suggested herein uses a larger aggregation level for a higher rank regardless of channel quality, thus implementing a multiplexed EPDCCH. Under an MU-MIMO circumstance, multiple users may monitor multiplexed EPDCCHs through the same time-frequency resource.

A combination of an antenna port and an SCID forms a unique spatial domain. For example, if a specific antenna port and a specific SCID are determined, a specific layer is defined. If data is sent to one user through one layer in the MU-MIMO scheme, the number of users that may be multiplexed in the same time-frequency resource region cannot but to rely on the number of spatial domains. Besides, in case a specific user is predefined to use a specific spatial domain, the spatial domain is more difficult to flexibly use.

In order to mitigate such limitations, it is offered to configure different antenna ports and SCIDs depending on search space candidate positions. For example, if antenna port 7 and SCID=0 are configured at the first candidate position, antenna port 8 and SCID=1 may be configured at the second candidate position. This is advantageous in that users' combinations for MU-MIMO may be achieved more flexibly without additional blind decoding complexity.

Meanwhile, a PRB (Physical Resource Block) occupied by a higher aggregation level may be rendered to share a lower al having the same antenna port/SCID, thereby avoiding duplicate channel estimation together with reducing overhead due to channel estimation.

The following technique is suggested to compensate for error weakness that is shown from schemes adopting high order modulation (hereinafter, HOM).

LOM (low order modulation) may apply to a basic unit of aggregation level for an EPDCCH transmitted using HOM or multi-layer transmission or more REs may be configured as compared when single layer transmission is used in order to compensate for relative noise weakness that occurs upon using HOM or multi-layer transmission.

When EPDCCH uses QPSK (Quadrature Phase Shift Keying), EPDCCH has an aggregation level defined using one sub-PRB as a basic unit. However, in contrast to transmission being performed through the aggregation, EPDCCH using 16-QAM (Quadrature amplitude modulation) may have aggregation level transmitted using one PRB as its basic unit. This reduces differences in error probabilities according to modulation schemes in the same aggregation level and thus provides the advantage that the base station does not need to perform separate operations according to modulation schemes.

Figure 14:
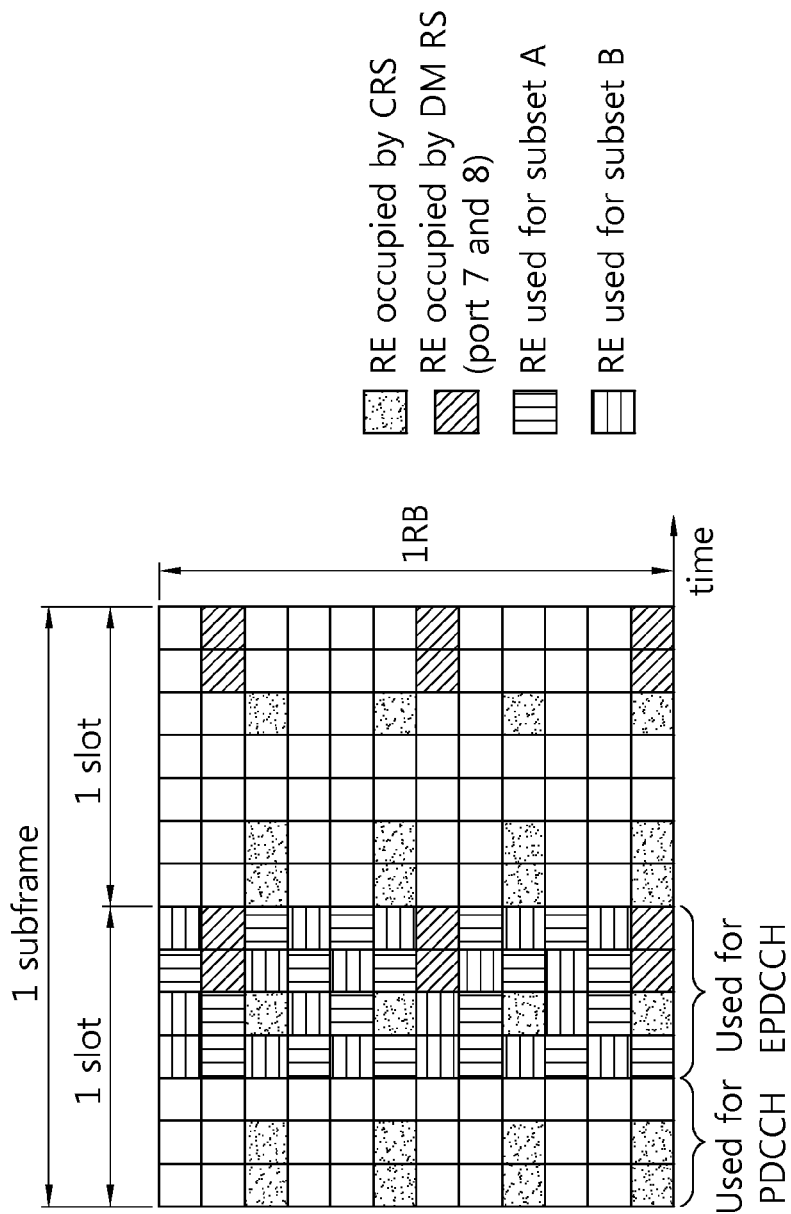
FIG. 14 shows an example EPDCCH allocation unit.

FIG. 14 shows an example unit of EPDCCH allocation.

Additionally, in order to configure one search space, different modulation schemes or numbers of layers may be configured per aggregation level.

For example, assuming that a lower aggregation level is generally used in a good channel circumstance, a higher order modulation scheme or a plurality of layers may be put to use. Assuming that a higher aggregation level is used when a band channel circumstance worsens or the transmission end is not exactly aware of the channel state, a lower order modulation scheme or a single layer may be used for more stable operation. More specifically, aggregation level 1 may use 16-QAM, and aggregation levels 2, 4, and 8 may use QPSK. The relationship between modulation scheme and aggregation level may be predetermined or the base station may send signaling to the wireless device to configure such relationship.

The above-described embodiments may be combined. For example, by utilizing modulation order, layer count, or relationship in basic unit between aggregation levels, aggregation level 1 using 16-QAM may perform per-sub PRB transmission, and aggregation levels 2, 4, and 8 using QPSK may perform per-PRB transmission. According to this, even when the modulation scheme or layer count is changed, n*K bits are transmitted in aggregation level n. K is a bit count in the DCI corresponding to one aggregation level. The number of bits transmitted by a single EPDCCH may be maintained to be multiples of the basic unit K.

Figure 15:
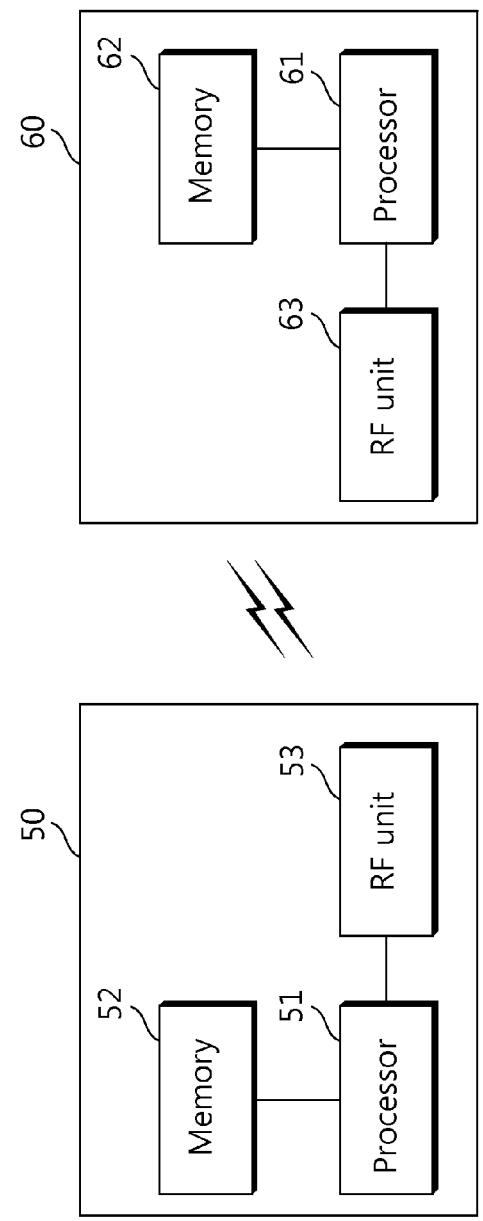
FIG. 15 is a block diagram illustrating a wireless communication system in which an embodiment of the present invention is implemented.

FIG. 15 is a block diagram illustrating a wireless communication system in which an embodiment of the present invention is implemented.

A base station 50 includes a processor 51, a memory 52, and an RF (radio frequency) unit 53. The memory 52 is connected with the processor 51 and stores various pieces of information for driving the processor 51. The RF unit 53 is connected with the processor 51 and transmits and/or receives radio signals. The processor 51 implements functions, processes, and/or methods as suggested herein. In the above-described embodiments, the operation of the base station may be implemented by the processor 51. The processor 51 may configure a search space depending on a plurality of layers and send an EPDCCH.

A wireless device 60 includes a processor 61, a memory 62, and an RF unit 63. The memory 62 is connected with the processor 61 and stores various pieces of information for driving the processor 61. The RF unit 63 is connected with the processor 61 and transmits and/or receives radio signals. The processor 61 implements functions, processes, and/or methods as suggested herein. In the above-described embodiments, the operation of the wireless device may be embodied by the processor 61. The processor 61 may monitor an EPDCCH in a search space.

The processor may include Application-Specific Integrated Circuits (ASICs), other chipsets, logic circuits, and/or data processors. The memory may include Read-Only Memory (ROM), Random Access Memory (RAM), flash memory, memory cards, storage media and/or other storage devices. The RF unit may include a baseband circuit for processing a radio signal. When the above-described embodiment is implemented in software, the above-described scheme may be implemented using a module (process or function) which performs the above function. The module may be stored in the memory and executed by the processor. The memory may be disposed to the processor internally or externally and connected to the processor using a variety of well-known means.

In the above exemplary systems, although the methods have been described on the basis of the flowcharts using a series of the steps or blocks, the present invention is not limited to the sequence of the steps, and some of the steps may be performed at different sequences from the remaining steps or may be performed simultaneously with the remaining steps. Furthermore, those skilled in the art will understand that the steps shown in the flowcharts are not exclusive and may include other steps or one or more steps of the flowcharts may be deleted without affecting the scope of the present invention.

What is claimed is:

1. A method of monitoring a control channel in a multi-antenna system in which a plurality of layers are defined, the method comprising:
   monitoring, by a single wireless device, a first enhanced physical downlink control channel (EPDCCH) in a first search space; and
   monitoring, by the single wireless device, a second EPDCCH in a second search space,
   wherein if the first search space includes one enhanced control channel element (ECCE) according to an aggregation level 1, then the one ECCE of the first EPDCCH in the first search space is mapped with a first layer using a first code word,
   wherein if the second search space includes two ECCEs including a first ECCE and a second ECCE according to an aggregation level 2, then the first ECCE of the second EPDCCH in the second search space is mapped with the first layer using a second code word and the second ECCE of the second EPDCCH in the second search space is mapped with a second layer using the second code word,
   wherein the first EPDCCH in the first search space using the aggregation level 1 is modulated with a higher modulation order than the second EPDCCH in the second search space using the aggregation level 2, and
   wherein the first layer is a lowest layer among the plurality of layers.

2. The method of claim 1, wherein the second layer is a layer next to the first layer.

3. The method of claim 1, wherein the first EPDCCH and the second EPDCCH carry different downlink control information (DCI) formats.

4. The method of claim 1, further comprising:
   receiving a first demodulation reference signal (DM RS) associated with the first EPDCCH in the first search space; and
   receiving a second DM RS associated with the second EPDCCH in the second search space.

5. The method of claim 4, wherein the first DM RS is applied with a same precoding as the first search space, and the second DM RS is applied with a same precoding as the second search space.

6. The method of claim 1, wherein the first and second search spaces are monitored in a same subframe.

7. The method of claim 6, further comprising:
   receiving, from a base station, information on a subframe where the first and second search spaces are to be monitored.

8. A single wireless device configured to monitor a control channel in a multi-antenna system in which a plurality of layers are defined, the single wireless device comprising:
   a radio frequency (RF) unit configured to transmit and receive a radio signal; and
   a processor operatively connected with the RF unit and configured to:
      monitor a first downlink control channel in a first search space; and
      monitor a second downlink control channel in a second search space,
      wherein if the first search space includes one enhanced control channel element (ECCE) according to an aggregation level 1, then the one ECCE of the first EPDCCH in the first search space is mapped with a first layer using a first code word,
      wherein if the second search space includes two ECCEs including a first ECCE and a second ECCE according to an aggregation level 2, then the first ECCE of the second EPDCCH in the second search space is mapped with the first layer using a second code word and the second ECCE of the second EPDCCH in the second search space is mapped with a second layer using the second code word,
      wherein the first EPDCCH in the first search space using the aggregation level 1 is modulated with a higher modulation order than the second EPDCCH in the second search space using the aggregation level 2, and
   wherein the first layer is a lowest layer among the plurality of layers.

9. The single wireless device of claim 8, wherein the second layer is a layer next to the first layer.

10. The single wireless device of claim 8, wherein the first EPDCCH and the second EPDCCH carry different downlink control information (DCI) formats.

11. The single wireless device of claim 10, wherein the processor is further configured to:
   receive a first demodulation reference signal (DM RS) associated with the first EPDCCH in the first search space; and
   receive a second DM RS associated with the second EPDCCH in the second search space.

12. The single wireless device of claim 11, wherein the first DM RS is applied with a same precoding as the first search space, and the second DM RS is applied with a same precoding as the second search space.

13. The single wireless device of claim 8, wherein the first and second search spaces are monitored in a same subframe.

14. The single wireless device of claim 13, wherein the processor is further configured to receive, from a base station, information on a subframe where the first and second search spaces are to be monitored.

* * * * *